United States Patent [19]
Peterson

[11] Patent Number: 6,107,595
[45] Date of Patent: *Aug. 22, 2000

[54] METHOD FOR RESISTANCE WELDING WITH DILUTION METAL AND PRODUCT THEREOF

[75] Inventor: Warren A. Peterson, Hobart, Ind.

[73] Assignee: Inland Steel Company, Chicago, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/821,701

[22] Filed: Mar. 20, 1997

Related U.S. Application Data

[63] Continuation of application No. 08/504,200, Jul. 19, 1995, abandoned.

[51] Int. Cl.[7] .............................. B23K 11/11; B23K 11/16
[52] U.S. Cl. ......................... 219/118; 219/94; 219/117.1
[58] Field of Search .............................. 219/85.14, 85.15, 219/94, 117.1, 118; 228/262.4, 262.41

[56] References Cited

U.S. PATENT DOCUMENTS

| | | | |
|---|---|---|---|
| T967,001 | 2/1978 | Brown et al. | 228/262.41 |
| 2,759,249 | 8/1956 | Eberle | 228/262.41 |
| 2,770,030 | 11/1956 | Carpenter et al. | 228/262.41 |
| 3,466,418 | 9/1969 | Webb | 219/118 |
| 3,617,677 | 11/1971 | Ritter et al. | 219/118 |
| 3,897,593 | 7/1975 | Becker | 219/92 |
| 4,037,073 | 7/1977 | Becker | 219/92 |
| 4,436,554 | 3/1984 | Omae et al. | 228/262.41 |
| 4,558,202 | 12/1985 | Bagnall et al. | 219/118 |
| 5,599,467 | 2/1997 | Okabe et al. | 219/118 |

FOREIGN PATENT DOCUMENTS

| | | | |
|---|---|---|---|
| 33 14 707 A1 | 11/1983 | Germany . | |
| 195 12 089 C1 | 10/1996 | Germany . | |
| 61-216871 | 9/1986 | Japan . | |
| 4-210878 | 7/1992 | Japan | 219/118 |

OTHER PUBLICATIONS

Patent Abstracts of Japan, Application No. EP 95 11 7315.

Nishio, et al., "Effects of Inserts in Seam Welds in Stainless Steel Foils", *Welding International*, vol. 8, No. 8, Aug. 1994, pp. 612–617.

Casciaro, et al., "Preliminary Results of Electron Beam Welds Using Filler Metals in the Form of Inserts", *Conference Proceedings*, Eurojoin 2, Seconds European Conference on Joining Technology 1994, May 16–18, pp. 611–620.

"Transition Material Improves Spot Welding of aluminum to Steel", *Welding Journal*, Jun., 1994, pp. 71–73.

*Primary Examiner*—Joseph Pelham
*Attorney, Agent, or Firm*—Marshall, O'Toole, Gerstein, Murray & Borun

[57] ABSTRACT

Two steel members are resistance welded using a filler therebetween in the form of either an insert or a metallized layer on the inner surface of one steel member. The steel members have respective compositions at least one of which comprises at least one alloying element having a concentration which contributes substantially to solidification cracking extensive enough to produce an unacceptable weld fracture. The filler has a composition which, during welding, melts and mixes with molten metal from the steel members, at the welding location, and dilutes the concentration there of one or more of the alloying elements which contribute substantially to solidification cracking. This reduces substantially the contribution, to solidification cracking, of each alloying element which has been so diluted. The cumulative dilution of these alloying elements is sufficient to produce an acceptable weld fracture.

37 Claims, 2 Drawing Sheets

METHOD FOR RESISTANCE WELDING WITH DILUTION METAL AND PRODUCT THEREOF

This is a continuation of U.S. application Ser. No. 08/504,200, filed Jul. 19, 1995, now abandoned.

BACKGROUND OF THE INVENTION

The present invention relates generally to resistance welding. More particularly it relates to the resistance welding of two steel members having respective compositions each comprising at least one alloying element having a concentration which contributes substantially to solidification cracking extensive enough to produce an unacceptable weld fracture.

In resistance welding, two steel members are welded together typically by positioning a first portion of one steel member in superimposed relation to a first portion of the other steel member, at a welding station where a current is flowed through the two superimposed portions of the steel members to fuse those portions together, thereby creating a weldment or weld nugget. The flow of current through the two steel members causes melting at the first portions of these two steel members, at the location of the weldment, and the metal at the weldment remains molten until the flow of current is reduced or ceases, following which solidification occurs at the location of the weldment.

During solidification, a phenomenon known as solidification cracking can occur in the weldment; solidification cracking can be extensive enough to produce an unacceptable weld fracture during a test known as chisel testing. In chisel testing, a hammer and chisel are used to forcibly separate the two steel members at the weld location. The resulting weld fracture can be (a) either wholly or partially through the weldment, or the fracture can be (b) in the first portion of one of the two steel members, in a so-called "heat-affected zone" immediately surrounding the weldment, with the fracture manifesting itself as a hole in the heat-affected zone. The type of fracture described at (a) in the preceding sentence is an unacceptable weld fracture while the type of fracture described at (b) is acceptable.

Solidification cracking occurs in the following manner. Cooling and solidification of the molten metal at a weld location occurs directionally from the periphery inwardly and is in the form of finger-shaped solidification cells or dendrites. Between adjacent dendrites, there is a continuous film of molten metal having a lower solidification temperature than the metal in the solidified dendrites, due to segregation between the dendrites of molten metal having a higher concentration of alloying elements such as carbon, manganese and the like. As further cooling occurs to a temperature below the solidification temperature of the segregated metal between the adjacent dendrites, voids are created by the synchronous application of solidification strain on the solidifying dendrites which pulls the dendrites apart before they can cohere with adjacent dendrites. The greater the concentration of an alloying element which segregates in the manner described above, the greater the contribution of that element to solidification cracking; and the greater the extent of solidification cracking, the greater the likelihood that there will be an unacceptable weld fracture.

There is a first group of steel compositions which, when used in two steel members which are to be resistance welded solely to each other, produce solidification cracking in the weldment extensive enough to produce an unacceptable weld fracture; and for this group, there are no commercially practical modifications to the welding schedule (welding parameters) which can be used to overcome this weld defect. In the case of this first group, the steel compositions must be replaced with other compositions more amenable to resistance welding. A drawback to such replacements is that the replacing steel compositions usually have physical or mechanical properties inferior to those of the steel compositions which are being replaced.

There is a second group of steel compositions which, when used in steel members which are to be resistance welded solely to each other, similarly produce extensive solidification cracking and unacceptable weld fractures; however, for this group of steel compositions, modifications to the welding schedule can often be employed to overcome the problem. Modifications to the welding schedule, however, usually result in increased expenditure of time, effort and money and a slower and less efficient welding operation.

SUMMARY OF THE INVENTION

The present invention enables one to weld together two steel members in which both members have a composition in the first group or in the second group or in which each member has a composition in a respective different group, without producing an unacceptable weld fracture, and without requiring either the replacement of any such composition or an extensive modification to the welding schedule.

The present invention utilizes, in conjunction with the two steel members, a filler having a part thereof separate and discrete from at least one of the two steel members. The filler is sandwiched between the superimposed portions of the two steel members, at the weld location. When current is flowed through the two superimposed portions of the steel members, at the welding station, there is a fusing together of the superimposed portions of the two steel members and a fusing of the filler to each steel member from which the aforementioned part on the filler is separate and discrete, thereby creating a weldment on the resulting steel product.

As previously noted, at least one of the steel compositions comprises a combination of alloying elements at least one of which has a concentration which contributes substantially to solidification cracking. The filler has a composition which differs from the compositions of the steel members and which, when mixed with the compositions of the steel members, modifies the weldment composition otherwise due solely to the steel members, to reduce substantially the solidification cracking and provide a weldment which produces an acceptable weld fracture. The filler composition mixes with the compositions of the steel members, at the welding station, during a resistance welding step when the metal at the weld location is in a molten state. When so mixed, the composition of the filler dilutes, in the weldment, the concentration of at least one element in the steel composition which contributes substantially to solidification cracking, thereby to reduce substantially the contribution, to solidification cracking, of each alloying element which has been so diluted. The cumulative dilution of these alloying elements is sufficient to produce an acceptable weld fracture The filler may be in the form of an insert which is separate and discrete from both steel members, or it may be in the form of a metallized layer on one of the two steel members.

The present invention may be utilized with first and second steel members each having a composition which, absent the filler, renders that member incapable of being welded to the other without producing an unacceptable weld fracture, regardless of modifications to the weld schedule.

The present invention may also be utilized with a pair of steel members having compositions capable of being welded without producing an unacceptable weld fracture, by employing an appropriately modified welding schedule; but when the present invention is utilized, one may employ with these compositions a welding schedule which could otherwise produce an unacceptable weld fracture.

Other features and advantage s are inherent in the subject matter claimed and disclosed herein or will be apparent to those skilled in the art from the following detailed description in conjunction with the accompanying diagrammatic drawings.

DETAILED DESCRIPTION

Figure 1:
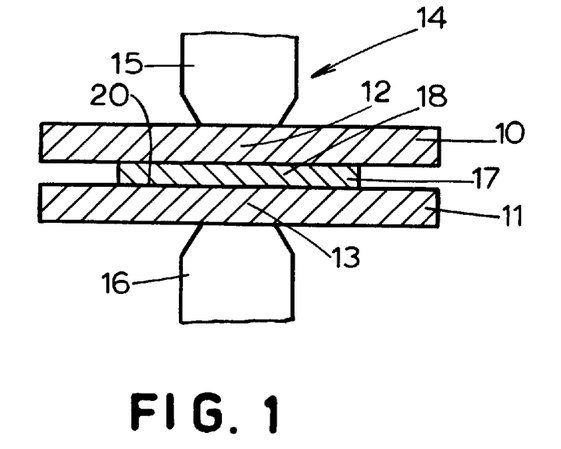
FIG. 1 is a sectional view illustrating a set-up for employing one embodiment of a method in accordance with the present invention.
Figure 2:
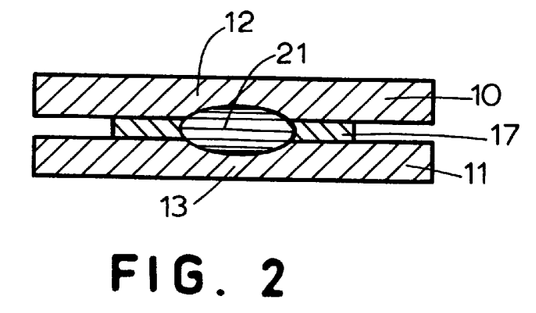
FIG. 2 is a sectional view illustrating an embodiment of a product in accordance with the present invention.
Figure 3:
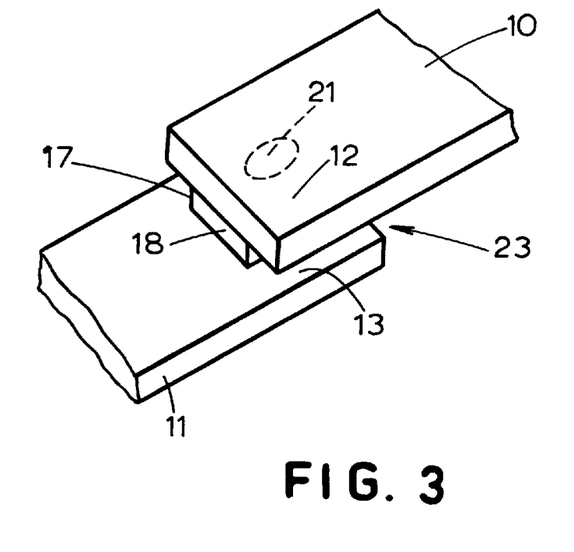
FIG. 3 is a perspective illustrating an embodiment of a product in accordance with the present invention.

Referring initially to FIGS. 1–3, there is illustrated a method for producing a resistance welded steel product 23 (FIG. 3) having a weldment 21 (FIGS. 2 and 3) which produces an acceptable weld fracture. The method comprises providing first a nd second steel members 10, 11 respectively, each having a respective first portion 12, 13 positioned in superimposed relation to the first portion of the other steel member, at a welding station indicated generally at 14 (FIG. 1) and comprising a pair of opposed electrodes 15, 16. The method further comprises providing a filler 17 having a part 18 separate and discrete from at least one of steel members 10, 11. In the embodiment illustrated in FIGS. 1–3, the filler is an insert which is separate and discrete from both steel members 10, 11. Alternatively, filler 17 may be in the form of a metallized layer applied to the inner surface of one of the two steel members, e.g. inner surface 20 of steel member 11.

Filler 17 is sandwiched between first portions 12, 13 of steel members 10, 11 at welding station 14. Current is applied, through electrodes 15, 16, to flow through a sandwich composed of portion 12 on first member 10, part 18 on filler 17 and portion 13 on second member 11. This brings about a resistance welding of steel members 11, 12 at welding station 14 to fuse together first portions 12, 13 and to fuse filler 17 to each steel member 10, 11 from which part 18 on filler 17 is separate and discrete, thereby creating weldment 21 on steel product 23.

Figure 4:
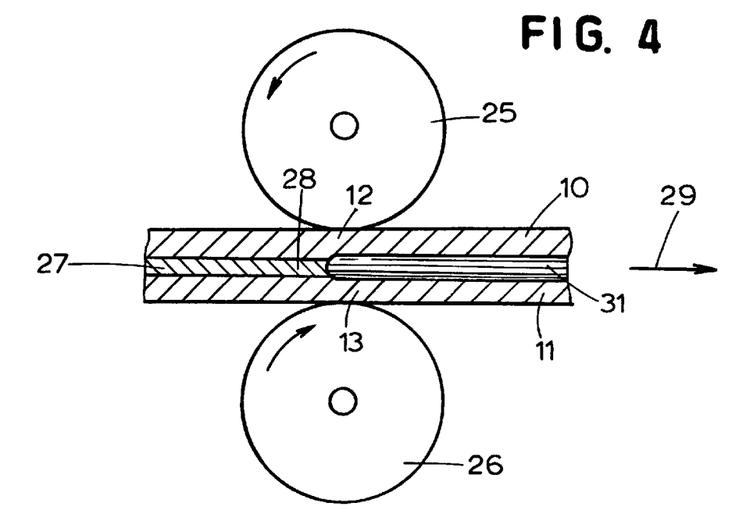
FIG. 4 is a sectional view illustrating another embodiment of a method in accordance with the present invention.

FIGS. 1–3 illustrate a form of resistance welding known as spot welding. FIG. 4 illustrates a form of resistance welding known as seam welding. In the embodiment of FIG. 4, a welding station indicated generally at 24 comprises a pair of opposed, counter-rotating, rotary electrodes 25, 26 between which is sandwiched portions 12, 13 of first and second steel members 10, 11 respectively, as well as part 28 of a continuous filler strip 27. The sandwich composed of steel members 10, 11 and filler strip 27 is advanced in the direction of arrow 29 as current flows through counter-rotating electrodes 25, 26 to produce a seam weldment 31.

First and second steel members have respective steel compositions which, when these members are resistance welded solely to each other, can produce solidification cracking in weldment 21 or 31 extensive enough to produce an unacceptable weld fracture. Examples of such steel compositions will be described subsequently. At least one of the steel compositions comprises a combination of elements at least one of which has a concentration which contributes substantially to solidification cracking. Examples of such elements will be described subsequently.

Filler 17 or 27 has a composition which differs from the compositions of steel members 10, 11 and which, when mixed with the compositions of these steel members, modifies the composition of weldment 21 or 31, otherwise due solely to the steel members, to reduce substantially the solidification cracking and provide a weldment 21 or 31 which produces an acceptable weld fracture. The filler composition mixes with the compositions of steel members 10, 11 at welding station 14 or 24, during the resistance welding step. The present invention employs the composition of the filler to dilute, in the weldment, the concentration of at least one of those elements in the steel composition which contributes substantially to solidification cracking, thereby reducing substantially the contribution, to solidification cracking, of each alloying element which has been so diluted. The cumulative dilution of these alloying elements is sufficient to produce an acceptable weld fracture.

As previously noted, filler 17 or 27 comprises, in one embodiment, an insert having a part thereof separate and discrete from both of steel members 10, 11. In this embodiment, the insert has a thickness which is substantially greater than 5% of the total thickness of the two steel members and the insert. Preferably the thickness of the insert is at least about 8% of the total thickness, e.g. 9–10%; and up to about 35% of the total thickness. Permissibly, the thickness may be greater than 35%; however, all of the advantages described above can be obtained with a filler thickness less than 35%. Referring now to FIGS. 1–3, superimposed portions 12, 13 of steel members 10, 11 define an area of mutual overlap for steel members 10, 11. As shown in FIGS. 1–3, when filler 17 is an insert, the insert is relatively flat, the insert is sandwiched between superimposed portions 12, 13, and all of the insert which is sandwiched between portions 12, 13 occupies less than the area of mutual overlap defined by portions 12, 13.

As was also noted above, another embodiment of filler 17 or 27 may comprise a metallized layer cohered to the inner surface of one of steel members 10, 11 at a location thereon where welding is to occur. In this embodiment, the metallized layer has a thickness greater than 5% of the total thickness of the two steel members and the metallized layer. Preferably, the metallized layer has a thickness of about 6–8% of the total thickness. In one preferred embodiment, the metallized layer is essentially pure iron or the like, and it may be applied to a steel member employing conventional metallizing techniques, such as electric arc spraying.

The iron applied by metallizing is applied in a molten condition employing a conventional metallizing gun using iron wire as a feed material. An important consideration when metallizing with iron is to avoid exposing the molten iron to air long enough to oxidize the iron. Accordingly, the molten iron preferably should be electric arc sprayed using, as a preferred spraying medium, a non-oxidizing gas such as argon or nitrogen. When air is employed as a spraying medium, the molten iron is sprayed from a relatively close distance (e.g. 2 inches (5 cm)) at supersonic speeds. The optimum parameters for metallizing, whatever the spraying medium or technique, are within the skill of the metallizing art and/or can be determined empirically.

Examples of steel member compositions with which the present invention may be usefully employed are set forth in the following table. All compositions in the table are ferritic steels, and all are non-stainless.

| Sample | WT. % | | | | | | | |
|---|---|---|---|---|---|---|---|---|
| | C | Mn | P | Si | Nb | Ti | Cr | B | V |
| A | 0.15 | 1.50 | 0.015 | 0.30 | | | | | |
| B | 0.22 | 1.20 | 0.02 | 0.27 | | | 0.50 | 0.003 | |
| C | 0.25 | 0.50 | 0.015 | | | 0.04 | | 0.001 | |
| D | 0.19 | 1.50 | 0.015 | 0.30 | | | 0.30 | 0.0005 | |
| E | 0.07 | 1.30 | 0.02 | | 0.07 | | | | 0.06 |
| F | 0.15 | 1.0 | 0.015 | | 0.02 | | | | 0.04 |
| G | 0.07 | 0.50 | 0.07 | | | | 0.07 | | |
| H | 0.004 | 1.20 | 0.09 | | 0.04 | 0.02 | | | |

All of the samples in the above tabulation are cold rolled steel strips except Sample F which is a hot rolled strip. Samples A–E are relatively high strength steel strips as reflected by the following table showing tensile or yield strengths for each of the samples.

| Sample | Strength (Tensile = T; Yield = Y) in ksi MPa) |
|---|---|
| A | T 140 (965) |
| B | T 165 (1137) |
| C | T 220 (1517) |
| D | T 150 (1034) |
| E | T 120 (827) |
| F | Y 50 (345) |
| G | Y 50 (345) |
| H | T 60 (414) |

In the foregoing tabulations, the steels identified as Samples A–F each has a composition which renders a steel member composed thereof incapable of being welded to another steel member having the same composition or any other composition designated by Samples A–F, without producing an unacceptable weld fracture, regardless of modifications to the welding schedule.

Steel samples identified as G and H in the foregoing tabulations are each of a type conventionally referred to as a rephosphorized steel wherein phosphorous is intentionally added to increase the content thereof above that normally present as residual or impurity amounts (such as the amounts in Samples A–F). A steel member having one of the rephosphorized compositions (Samples G and H) is capable of being welded to another steel member having the same composition (or to another such rephosphorized steel composition) without producing an unacceptable weld fracture, by employing an appropriately modified welding schedule.

By employing the present invention, a steel member having a composition exemplified by Samples A–F may be welded to a steel member having the same composition or another composition in the group A–F, and the resulting product will produce an acceptable weld fracture.

Similarly, when employing the present invention, rephosphorized steels such as G–H may be welded to each other, or to another rephosphorized steel, employing a welding schedule which would otherwise produce an unacceptable weld fracture (i.e. in the absence of a procedure in accordance with the present invention), and the resulting product will produce an acceptable weld fracture.

In addition, steel exemplified by Samples A–F may be welded to steels exemplified by Samples G–H, when employing the present invention, and the resulting product will have an acceptable weld fracture.

In all embodiments of the present invention, steel members having the same composition may be welded to each other or to other steel compositions which benefit from employing the present invention, and the resulting product will have an acceptable weld fracture.

As noted above, steel compositions which benefit from the present invention comprise a combination of elements at least one of which has a concentration which contributes substantially to solidification cracking. Such elements include, for example, carbon, manganese, silicon, phosphorous, sulfur, boron, titanium and combinations thereof. Examples of elements which act together to contribute substantially to solidification cracking comprise carbon plus sulfur plus phosphorus, particularly in rephosphorized steel; carbon and manganese; boron plus sulfur; and titanium plus sulfur.

The present invention may be usefully employed on either (a) uncoated steel members having, for example, the compositions described above or (b) steel members which have been coated with zinc or the like.

As noted above, when the filler is a metallized layer, a preferred filler composition is essentially pure iron applied with an electric arc spray gun using iron wire as a feed material. Typical examples of other metallizing wire compositions, for use when the filler is a metallized layer, are tabulated below.

| | Wt. % | | |
|---|---|---|---|
| Specimen | C | Mn | Cr |
| X | 0.03 | 0.20 | — |
| Y | 0.25 | 2.00 | 0.20 |

Although Specimen Y contains relatively large amounts of carbon and manganese, these are contents for the filler material when it is in the form of a wire prior to electric arc spraying with a metallizing gun. During electric arc spraying, a large proportion of the carbon is oxidized to a gas which is withdrawn from the metallizing location, and a large proportion of the manganese is oxidized to form a particulate material which is not deposited and retained as part of the metallizing layer. The net result is relatively small percentages of carbon and manganese in the metallized layer, insufficient to interfere with the dilution characteristics of the metallized layer.

When the filler is an insert, the insert may have a composition corresponding to Specimen X in the above tabulation of metallizing wires.

The insert may also be composed of interstitial-free steel, i.e. a steel in which there is no free carbon. In such a steel the carbon is either tied up with another element, such as titanium, or there is essentially no carbon present in the steel. Examples of steels for inserts are tabulated below.

| ELEMENT | Wt. % | |
| --- | --- | --- |
| Carbon | 0.005 | 0.005 |
| Manganese | 0.17 | 0.17 |
| Aluminum | 0.06 | 0.06 |
| Phosphorus | 0.01 max. | — |
| Sulfur | 0.01 max. | — |
| Titanium | 0.07 | — |
| Nitrogen | — | >0.005 |

Under some conditions, when both titanium and sulfur are present in a steel member, they can act together to contribute to the solidification cracking problem. Titanium will normally combine with nitrogen, carbon and oxygen before sulfur. Therefore, from the standpoint of minimizing the contributors to solidification cracking, one should avoid a situation in which there is titanium uncombined with nitrogen, carbon and oxygen and available to combine with sulfur.

In one preferred embodiment, the insert is composed of pure iron, optionally with some manganese. In the absence of carbon, a small amount of manganese (e.g. 0.20%) does not interfere with the desired dilution characteristics of the filler metal.

Other filler compositions may be employed for the insert so long as the filler composition dilutes the concentration of an element in the steel composition which contributes substantially to solidification cracking, so as to reduce substantially the contribution of that element to solidification cracking. The optimum filler composition, from the standpoint of these considerations, would be pure iron.

When each of the first and second steel members has a different composition each comprising at least one element having a concentration which contributes substantially to solidification cracking, the filler composition preferably is one which dilutes each such element, from each of the respective steel compositions.

Figure 5:
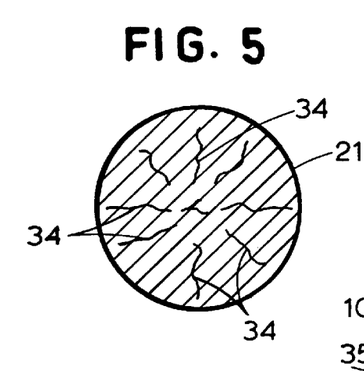
FIG. 5 is a sectional view illustrating, representationally, a weldment having solidification cracking.
Figure 6:
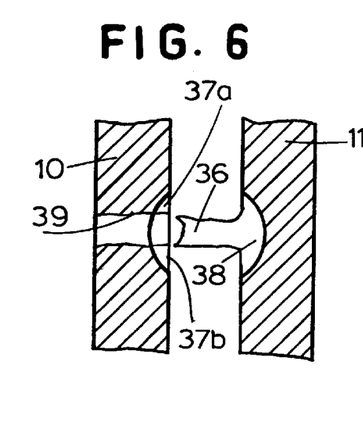
FIGS. 6 and 6A are sectional views illustrating weldments having unacceptable weld fractures.
Figure 6A:
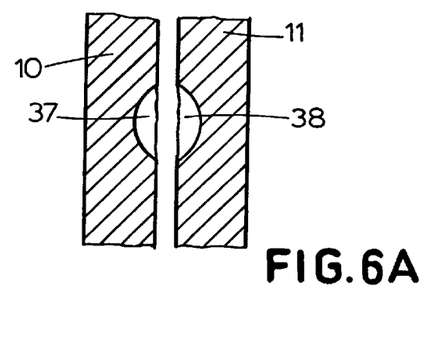
Figure 7:
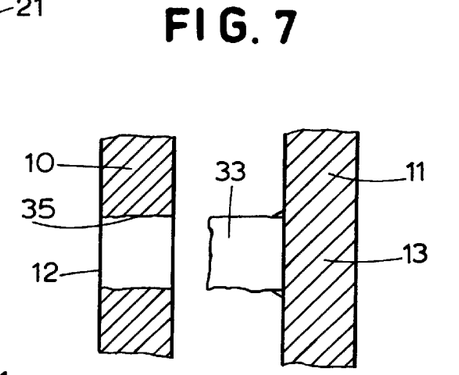
FIG. 7 is a sectional view illustrating a weldment having an acceptable weld fracture.

Referring now to FIGS. 5–7, these figures illustrate, representationally, solidification cracking (FIG. 5), an acceptable weld fractures (FIG. 7) and unacceptable weld fractures (FIGS. 6 and 6A). FIG. 5 illustrates a cross-section of a spot weldment 21 within which solidification cracks are illustrated representationally by lines 34. These cracks or voids 34 occurred when the weldment cooled from a molten state. Solidification cells or dendrites were initially separated by films of molten metal containing higher concentrations of alloying elements and having a lower freezing temperature than the dendrites. Upon further cooling, the dendrites pulled apart as a result of solidification strains, leaving spaces which could not be filled by the molten metal when the latter solidified. When the weldment or weld nugget 21 is subjected to a chisel test (described below), the resulting fracture propagates along, and between, solidification cracks 34 resulting in unacceptable weld fractures, illustrated in FIGS. 6 and 6A. More particularly, FIG. 6A shows a spot weld nugget fractured into two portions 37, 38. In FIG. 6A, the weld fracture occurs wholly through the weld nugget. In FIG. 6, the fracture occurs partially through the weld nugget, separating (i) weld nugget portion 38 and a weld button 36, attached to member 11, from (ii) weld nugget portions 37a and 37b, attached to member 10 in which a hole 39 has been left by weld button 36. Weld fractures occurring wholly or partially through a weld nugget are unacceptable weld fractures (as that term is used herein).

When one employs the present invention, weld nugget 21 has fewer solidification cracks 34, and they are spaced further apart. In addition, the modified weld nugget composition resulting from dilution by the filler metal, is tougher and less brittle than a weld nugget of unmodified composition. The net result is that, in a chisel test, there is increased resistance to fracture propagation between pre-existing solidification cracks 34. Instead, fracture is promoted in a so-called "heat-affected zone" located immediately around and adjacent to the periphery of spot weld nugget 21. In such a case, the weld fracture manifests itself as a hole 35 in one of the steel members, e.g. in steel member 10 in the first portion 12 thereof (FIG. 7). The resulting spot weld button 33 and hole 35 are characteristic of an acceptable weld fracture, in which there is no fracture through the weld nugget itself.

In a weld fracture chisel test, referred to above, a chisel is used to drive apart a pair of layered steel members spot welded together at their interface. The sharp edge of the chisel is placed at the interface of the two layered steel members, at a location between two adjacent spot weld nuggets spaced apart 1.5 in. (3.8 cm) from center to center of the weld nuggets. Typically, the test specimen measures 1.5 by 5 in. (3.8 by 12.7 cm) and has three weldments thereon. The chisel is driven into the interface, forcing apart the two layered members, until there is a weld fracture, either of the unacceptable type described two paragraphs above or of the acceptable type described in the immediately preceding paragraph.

The microstructure of weld nugget 21 is martensite or bainite, as is the microstructure of the heat-affected zone around weld nugget 21.

Reducing the number of solidification cracks 34 in weld nugget 21, in accordance with the present invention, reduces the likelihood that weld fracture will occur partially or completely through weld nugget 21.

Tests were run to determine the effect of insert thickness on weld fracture. The tests employed two steel members having the composition of Sample A, in the first tabulation above, and an insert having a composition corresponding to Specimen X in the second tabulation above. The tests employed sandwiches containing two steel members each having the same thickness, in the range 0.023–0.075 in. (0.058–0.191 cm), and an insert having a thickness in the range 0.003–0.026 in. (0.008–0.066 cm). Insert thickness, as a percent of the total thickness, varied from zero to 35%. Insert thicknesses of 9%, 18%, 26% and 35% provided, on average, acceptable weld fractures in about 98%, 85%, 90% and 98% of the cases, respectively. Without an insert, the percentage of acceptable weld fractures was greatly reduced below the lowest percentage achieved with inserts. Other testing indicates that an insert thickness of 3% is insufficient.

There are expedients, other than using a filler in accordance with the present invention, which can reduce the number of solidification cracks in a weld nugget, but these other expedients, namely changing the composition of the steel members or modifying the welding schedule, have serious drawbacks, as adverted to above. Changing the composition of the steel members, e.g. by reducing the concentration of alloying elements in the steel members, usually results in a lowering of the physical or mechanical properties of the steel, which is undesirable. When physical properties such as strength are reduced, this can only be offset by increasing the thickness of the steel, and this in turn increases the weight of the product which, in cases like automobile bodies or structural members, is undesirable from a fuel-consuming standpoint.

All other conditions being the same, when one employs a filler metal in accordance with the present invention, there is typically an increase of at least 20% in the weldment's fracture strength, under various loading conditions (e.g. cross tension, tension shear, etc.).

Modifying the welding schedule will alleviate the weld fracture problem, due to solidification cracking, in some but not all compositions. As to those compositions for which modifications to the welding schedule are useful, doing so has other drawbacks from the standpoint of reducing the flexibility of the welding operation which could otherwise be employed.

One such welding schedule modification is tempering the weld, using the welding electrodes. In this procedure, after the welding current is shut off, it is turned on again, with the electrodes in place, at a lower current than the welding current, thereby to heat the weldment for a short period of time to a temperature below that at which the weldment melts, thereby rendering the weldment less brittle.

Another welding schedule modification is to increase the welding time, thereby further heating and reducing the strength of the heat-affected zone around the weld nugget, which promotes fracture in the weld-affected zone. A third expedient is to remove the welding electrodes as quickly as possible from the welding location on the steel members, thereby allowing the weldment to freely cool at a slower cooling rate than would occur if the welding electrodes were left in place. The welding electrodes are typically water cooled which allows a faster dissipation of heat from the welding location than if the welding nugget were allowed to freely cool. A slower cooling rate changes the microstructure of the weld nugget and increases its resistance to fracture.

When steel members 10, 11 have respective steel compositions capable of being welded together without producing an unacceptable weld fracture, by employing an appropriately modified welding schedule, one may, when employing the present invention, utilize a welding schedule which would otherwise produce an unacceptable weld fracture (i.e. in the absence of the present invention). Moreover, the welding schedule can be optimized without employing any constraints dictated by concerns about unacceptable weld fractures.

Notwithstanding the applicability of the present invention to steel compositions of the type described in the preceding paragraph, the present invention is most applicable to steel compositions for which welding schedule modifications will not alleviate unacceptable weld fracture. Moreover, when the present invention is employed for such compositions, the welding schedule can be optimized without employing any constraints dictated by concerns about unacceptable weld fractures.

The foregoing detailed description has been given for clearness of understanding only and no unnecessary limitations should be understood therefrom, as modifications will be obvious to those skilled in the art.

What is claimed is:

1. A welded steel product in which two steel members are resistance welded together at a weld location on said product, said product comprising:
   first and second steel members each in the form of a flat steel strip and each having a first portion thereof at said weld location;
   each first portion being in superimposed relation to the first portion of the other steel member, said superimposed portions defining an area of mutual overlap for said steel members;
   a filler sandwiched between said superimposed first portions of the first and second steel members at said weld location;
   a resistance weldment, at said weld location, fusing the first and second steel members together at their respective first portions and fusing said filler to each steel member;
   said weldment being substantially devoid of solidification cracking extensive enough to produce an unacceptable weld fracture;
   said first and second steel members each having respective steel compositions which are ferritic and non-stainless and which, when said members are resistance welded solely to each other, can produce solidification cracking in said weldment extensive enough to produce an unacceptable weld fracture;
   at least one of said steel compositions comprising a combination of elements at least one of which has a concentration which contributes substantially to said solidification cracking;
   said filler having a composition which differs from the compositions of said steel members and which, at said weld location, modifies the weldment composition otherwise due solely to said first and second steel members, to reduce substantially said solidification cracking and provide a weldment which produces an acceptable weld fracture;
   said filler composition comprising means for diluting, in said weldment, the concentration of at least said one element in said steel composition, to reduce substantially the contribution of that element to solidification cracking;
   said filler having one of the following combinations of features, (a) or (b):
   (a) said filler being in the form of an insert, said insert being composed of essentially pure iron or interstitial-free steel and having a thickness which is substantially greater than 5% of the total thickness of said two steel members and said insert, said insert being relatively flat, and all of said insert which is sandwiched between said superimposed first portions of the steel members occupying less than said area of overlap defined by said superimposed portions;
   (b) said filler being in the form of a metallized layer cohered to the surface of one of said steel members at said weld location, and composed of essentially pure iron, and having a thickness greater than 5% of the total thickness of said two steel members and said metallized layer.

2. A welded steel product as recited in claim 1 wherein: said filler is an insert; and
the thickness of said insert is at least about 8% of said total thickness.

3. A welded steel product as recited in claim 2 wherein: the thickness of said insert is up to about 35% of said total thickness.

4. A welded steel product as recited in claim 1 wherein: said filler is a metallized layer having a thickness of about 6–8% of said total thickness.

5. A welded steel product as recited in claim 1 wherein: the elements having concentrations which contribute substantially to said solidification cracking are members of the group comprising carbon, manganese, phosphorus, sulfur, silicon, boron, titanium and combinations thereof.

6. A welded steel product as recited in claim 5 wherein: said first and second steel members each have a composition which renders that member incapable of being welded to the other without producing an unacceptable weld fracture, regardless of modifications to the welding schedule.

7. A method as recited in claim 6 wherein:
each steel member has the same composition.

8. A welded steel product as recited in claim 5 wherein:
each of said first and second steel members has a different composition each comprising at least one of said elements having a concentration which contributes substantially to said solidification cracking.

9. A welded steel product as recited in claim 8 wherein:
said filler composition comprises means for diluting at least said one element from the composition of said first steel member and at least said one element from the composition of said second steel member.

10. A welded steel product as recited in claim 1 wherein:
each steel member has the same composition.

11. A welded steel product as recited in claim 1 wherein:
each steel member has a composition which comprises at least one element having a concentration which contributes substantially to said solidification cracking;
and said filler composition comprises means for diluting at least said one element from the composition of said first steel member and at least said one element from the composition of said second steel member.

12. A method for producing a resistance welded steel product having a weldment which is substantially devoid of solidification cracking extensive enough to produce an unacceptable weld fracture, said method comprising the steps of:
providing first and second steel members each in the form of a flat steel strip and each having a first portion;
positioning the first portion of one of said steel members in superimposed relation to the first portion of the other steel member, at a welding station;
said superimposed first portions defining an area of mutual overlap for said steel members;
providing a filler;
sandwiching said filler between said superimposed first portions of the two steel members, at said welding station;
said filler having one of the following combinations of features, (a) or (b):
(a) said filler being in the form of an insert, said insert being composed of essentially pure iron or interstitial-free steel and having a thickness which is substantially greater than 5% of the total thickness of said two steel members and said insert, said insert being relatively flat, and all of said insert which is sandwiched between said superimposed first portions of the steel members occupying less than said area of overlap defined by said superimposed portions;
(b) said filler being in the form of a metallized layer cohered to the surface of one of said steel members at said weld location, and composed of essentially pure iron, and having a thickness greater than 5% of the total thickness of said two steel members and said metallized layer;
resistance welding said two steel members at said welding station to fuse together said first portions of said steel members and to fuse said filler to each steel member to form a weldment which is substantially devoid of solidification cracking extensive enough to produce an unacceptable weld fracture;
said first and second steel members each having respective steel compositions which are ferritic and non-stainless and which, when said members are resistance welded solely to each other, can produce solidification cracking in said weldment extensive enough to produce an unacceptable weld fracture;
at least one of said steel compositions comprising a combination of elements at least one of which has a concentration which contributes substantially to said solidification cracking;
said filler having a composition which differs from the compositions of said steel members and which, when mixed with the compositions of said steel members, modifies the weldment composition otherwise due solely to said steel members, to reduce substantially said solidification cracking and provide a weldment which produces an acceptable weld fracture;
said filler composition undergoing mixing with the compositions of said steel members, at said welding station, during said resistance welding step;
and employing the composition of said filler to dilute, in said weldment, the concentration of at least said one element in said steel composition, to reduce substantially the contribution of that element to solidification cracking.

13. A method as recited in claim 12 wherein:
said filler is an insert; and
the thickness of said insert is at least about 8% of said total thickness.

14. A method as recited in claim 13 wherein:
the thickness of said insert is up to about 35% of said total thickness.

15. A method as recited in claim 12 wherein:
said filler is a metallized layer having a thickness of about 6–8% of said total thickness.

16. A method as recited in claim 12 wherein:
the elements having concentrations which contribute substantially to said solidification cracking are members of the group comprising carbon, manganese, phosphorus, sulfur, silicon, boron, titanium and combinations thereof.

17. A method as recited in claim 16 wherein:
said first and second steel members each have a composition which renders that member incapable of being welded to the other without producing an unacceptable weld fracture, regardless of modifications to the welding schedule.

18. A method as recited in claim 17 wherein:
each steel member has the same composition.

19. A method as recited in claim 16 wherein:
each of said first and second steel members has a different composition each comprising at least one of said elements having a concentration which contributes substantially to said solidification cracking.

20. A method as recited in claim 19 wherein:
said filler composition is employed to dilute at least said one element from the composition of said first steel member and at least said one element from the composition of said second steel member.

21. A method as recited in claim 19 wherein:
at least one of said steel members has a composition capable of being welded to the other steel member without producing an unacceptable weld fracture, by employing an appropriately modified welding schedule;
and said method comprises employing a welding schedule which would otherwise produce an unacceptable weld fracture in the absence of said filler.

22. A method as recited in claim 12 wherein:

said steel members have respective steel compositions capable of being welded together without producing an unacceptable weld fracture, by employing an appropriately modified welding schedule;

and said method comprises employing a welding schedule which would otherwise produce an unacceptable weld fracture in the absence of said filler.

23. A method as recited in claim 22 wherein:

said steel members each have the same composition.

24. A method as recited in claim 12 wherein:

each steel member has the same composition.

25. A method as recited in claim 12 wherein:

each steel member has a composition which comprises at least one element having a concentration which contributes substantially to said solidification cracking;

and said filler composition is employed to dilute at least said one element from the composition of said first steel member and at least said one element from the composition of said second steel member.

26. A welded steel product as recited in claim 5 wherein each steel member has a composition in one of the following two groups, (i) or (ii):

(i) a high strength steel composition which renders the steel member incapable of being welded to another steel member from the same group without producing extensive solidification cracking and unacceptable weld fracture, regardless of modifications to the welding schedule, in the absence of said filler;

(ii) a rephosphorized steel composition which renders the steel member capable of being welded to another steel member from the same group without producing extensive solidification cracking and unacceptable weld fracture, by employing an appropriately modified welding schedule, in the absence of said filler.

27. A welded steel product as recited in claim 26 wherein:

each of said steel members has a composition in group (i).

28. A welded steel product as recited in claim 26 wherein:

each of said steel members has a composition in group (ii).

29. A welded steel product as recited in claim 26 wherein:

one of said steel members has a composition in group (i) and the other steel member has a composition in group (ii).

30. A method recited in claim 16 wherein each steel member has a composition in one of the following two groups, (i) or (ii):

(i) a high strength steel composition which renders the steel member incapable of being welded to another steel member from the same group without producing extensive solidification cracking and unacceptable weld fracture, regardless of modifications to the welding schedule, in the absence of said filler;

(ii) a rephosphorized steel composition which renders the steel member capable of being welded to another steel member from the same group without producing extensive solidification cracking and unacceptable weld fracture, by employing an appropriately modified welding schedule, in the absence of said filler;

and said method comprises employing a welding schedule which would produce extensive solidification cracking and unacceptable weld fracture in the absence of said filler.

31. A method as recited in claim 30 wherein:

each of said steel members has a composition in group (i).

32. A method as recited in claim 30 wherein:

each of said steel members has a composition in roup (ii).

33. A method as recited in claim 30 wherein:

one of said steel members has a composition in group (i) and the other steel member has a composition in group (ii).

34. A welded steel product as recited in claim 1 wherein:

said filler is said metallized layer.

35. A method as recited in claim 12 wherein:

said filler is said metallized layer.

36. A welded steel product in which two steel members are resistance welded together at a weld location on said product, said product comprising:

first and second steel members each in the form of a flat steel strip and each having a first portion thereof at said weld location;

each first portion being in superimposed relation to the first portion of the other steel member, said superimposed portions defining an area of mutual overlap for said steel members;

a filler sandwiched between said superimposed first portions of the first and second steel members at said weld location;

a resistance weldment, at said weld location, fusing the first and second steel members together at their respective first portions and fusing said filler to each steel member;

said weldment being substantially devoid of solidification cracking extensive enough to produce an unacceptable weld fracture;

said first and second steel members each having respective steel compositions which are ferritic and non-stainless and which, when said members are resistance welded solely to each other, can produce solidification cracking in said weldment extensive enough to produce an unacceptable weld fracture;

at least one of said steel compositions comprising a combination of elements at least one of which has a concentration which contributes substantially to said solidification cracking;

said filler having a composition which differs from the compositions of said steel members and which, at said weld location, modifies the weldment composition otherwise due solely to said first and second steel members, to reduce substantially said solidification cracking and provide a weldment which produces an acceptable weld fracture;

said filler composition comprising means for diluting, in said weldment, the concentration of at least said one element in said steel composition, to reduce substantially the contribution of that element to solidification cracking;

said filler being in the form of an insert, said insert being composed of interstitial-free steel and having a thickness which is substantially greater than 5% of the total thickness of said two steel members and said insert, said insert being relatively flat, and all of said insert which is sandwiched between said superimposed first portions of the steel members occupying less than said area of overlap defined by said superimposed portions.

37. A method for producing a resistance welded steel product having a weldment which is substantially devoid of solidification cracking extensive enough to produce an unacceptable weld fracture, said method comprising the steps of:

providing first and second steel members each in the form of a flat steel strip and each having a first portion;

positioning the first portion of one of said steel members in superimposed relation to the first portion of the other steel member, at a welding station;

said superimposed first portions defining an area of mutual overlap for said steel members;

providing a filler;

sandwiching said filler between said superimposed first portions of the two steel members, at said welding station;

said filler being in the form of an insert, said insert being composed of interstitial-free steel and having a thickness which is substantially greater than 5% of the total thickness of said two steel members and said insert, said insert being relatively flat, and all of said insert which is sandwiched between said superimposed first portions of the steel members occupying less than said area of overlap defined by said superimposed portions;

resistance welding said two steel members at said welding station to fuse together said first portions of said steel members and to fuse said filler to each steel member to form a weldment which is substantially devoid of solidification cracking extensive enough to produce an unacceptable weld fracture;

said first and second steel members each having respective steel compositions which are ferritic and non-stainless and which, when said members are resistance welded solely to each other, can produce solidification cracking in said weldment extensive enough to produce an unacceptable weld fracture;

at least one of said steel compositions comprising a combination of elements at least one of which has a concentration which contributes substantially to said solidification cracking;

said filler having a composition which differs from the compositions of said steel members and which, when mixed with the compositions of said steel members, modifies the weldment composition otherwise due solely to said steel members, to reduce substantially said solidification cracking and provide a weldment which produces an acceptable weld fracture;

said filler composition undergoing mixing with the compositions of said steel members, at said welding station, during said resistance welding step;

and employing the composition of said filler to dilute, in said weldment, the concentration of at least said one element in said steel composition, to reduce substantially the contribution of that element to solidification cracking.

* * * * *